United States Patent [19]

Estes et al.

[11] 4,083,799
[45] Apr. 11, 1978

[54] METHOD OF STEAM REFORMING

[75] Inventors: John Harold Estes; Edwin Robert Kerr; Tansukhlal Gokaldas Dorawala, all of Wappingers Falls, N.Y.

[73] Assignee: Texaco Inc., New York, N.Y.

[21] Appl. No.: 425,005

[22] Filed: Dec. 14, 1973

Related U.S. Application Data

[63] Continuation-in-part of Ser. No. 322,050, Jan. 8, 1973, abandoned.

[51] Int. Cl.$^2$ .................. C07C 1/02; B01D 15/06
[52] U.S. Cl. ........................ 252/373; 252/416
[58] Field of Search .............................. 252/373, 416

[56] References Cited

U.S. PATENT DOCUMENTS

| | | | |
|---|---|---|---|
| 2,828,196 | 3/1958 | Glover et al. | 252/373 |
| 2,868,632 | 1/1959 | Milbourne | 252/373 |
| 3,418,093 | 12/1968 | Davies | 252/373 |
| 3,453,146 | 7/1969 | Bawa et al. | 252/373 |

Primary Examiner—A. Siegel
Attorney, Agent, or Firm—Thomas H. Whaley; Carl G. Ries; Carl G. Seutter

[57] ABSTRACT

Hydrocarbons are reformed with steam in the presence of, as catalyst, an activated metal screen containing a major portion of nickel. Preferably a non-aromatic hydrocarbon is reacted with steam over inconel metal catalyst at 1200° F–1400° F and 0–300 psig.

19 Claims, No Drawings

METHOD OF STEAM REFORMING

RELATED APPLICATIONS

This application is a continuation-in-part of application Ser. No. 322,050, filed Jan. 8, 1973 now abandoned for Method of Steam Reforming by John H. Estes, Edwin R. Kerr, and Tansukhlal G. Dorawala.

FIELD OF THE INVENTION

This invention relates to the conversion of hydrocarbons. More particularly, it relates to the catalytic conversion of non-aromatic hydrocarbons, such as low molecular weight aliphatic hydrocarbons, into hydrogen-rich gaseous products in the presence of steam.

BACKGROUND OF THE INVENTION

As is well known to those skilled in the art, steam reforming of hydrocarbons has commonly been carried out by passing a hydrocarbon, typically one boiling up to about 600° F, together with steam through a furnace at 1500°–2000° F to yield a product containing principally hydrogen together with lesser amounts of carbon dioxide, carbon monoxide, and gaseous hydrocarbons. A typical product gas may contain 45%–60% $H_2$, 8%–15% $CO_2$, 10%–25% CO, and 15%–40% hydrocarbons.

Steam reforming is commonly carried out in the presence of catalysts; and typical catalyst compositions may include zeolites or amorphous inorganic oxides such as silica, alumina, magnesia, zirconia, etc. It is found that the typical supported catalyst degrades in the presence of the reactants during the extended periods of reaction; and this factor limits the conditions under which reforming may be carried out in order to permit reasonable catalyst life.

It is an object of this invention to provide a steam reforming process characterized by the presence of a rugged, regenerable, steam-stable catalyst. Other objects will be apparent to those skilled in the art.

STATEMENT OF THE INVENTION

In accordance with certain of its aspects, the novel process of this invention for steam reforming a nonaromatic hydrocarbon charge may comprise passing a mixture of steam and non-aromatic hydrocarbon at 1200°–1400° F into contact with an activated catalyst consisting essentially of a massive metal screen containing at least 50%, and preferably 50%–95% nickel thereby forming a product gas containing hydrogen and carbon dioxide;

maintaining the mole ratio of steam to hydrocarbon at 15–70:1; and recovering said product gas.

DESCRIPTION OF THE INVENTION

In accordance with certain of its aspects, the non-aromatic charge hydrocarbon may preferably be an aliphatic hydrocarbon, either pure or in admixture, typically having a boiling point of 176°–1292° F (80°–700° C). Light paraffinic streams may be employed. Typical of such streams are those containing predominantly lower paraffins including butanes, pentanes, etc. and illustrative of such streams are light straight run products, various condensates, and raffinates from which aromatics have been extracted.

Although the charge may be a pure $C_4$ or $C_5$ paraffin, it more commonly may be a mixture containing $C_4$ to $C_8$ paraffins. The paraffin content may be 60%–100%, preferably 70%–85%, say about 80%. The charge may also contain naphthenes in amount of 5%–20%, preferably 5%–10%, say 8%, and aromatic components in amount of 5%–15%, say 12%. Lesser amounts of other components may be present.

A typical charge stream may be a heavy Udex raffinate (from which the aromatics have been extracted) having the following composition:

| | Udex Raffinate | |
|---|---|---|
| | % by Volume | |
| Component | Broad | Typical |
| Paraffins | 70–85 | 80.7% |
| Naphthenes | 5–20 | 7.8 |
| Alkylbenzenes | 5–15 | 11.5 |
| | | 100.0 |

This raffinate may have an IBP of 190° F, an EP of 275° F, and an API gravity of 70.1.

Another typical charge stream may be a light straight run distillate (obtained from debutanization of a straight run gasoline) having the following composition:

| | Light Straight Run Distillate | |
|---|---|---|
| | % by Volume | |
| Component | Broad | Typical |
| Paraffins | 80–99 | 94.0 |
| Naphthenes | 0–8 | 3.0 |
| Aromatics | 0–15 | 3.0 |

This distillate may have an IBP of 92° F, an EP of 300° F, and an API gravity of 79.2.

Particularly desirable results may be achieved by use, as the hydrocarbon charge, of a non-aromatic composition containing substantial proportions of paraffinic and/or naphthenic hydrocarbons and lesser proportions of aromatic hydrocarbons. Presence of up to about 15%–20% aromatics may be tolerated-although large proportions of aromatics will decrease the yield of hydrogen to undesirable levels. The preferred charge is a raffinate from which aromatics have been extracted; use of such a change permits steam reforming to be carried out most economically with maximum yield of hydrogen and decreased yield of undesired by-products.

Steam reforming of the hydrocarbon charge may be carried out by passing the charge at 1200°–1400° F, say 1250° F to a steam reforming zone.

Clearly the preferred temperature of reaction may depend upon many factors including the nature of the charge material, the purity of the charge material, the ability of the processor to handle by-products, etc. In the case of a charge undesirably containing substantial proportions of alkylaromatics, steam reforming may be carried out preferably above the preferred lower limit of 1200° F eg typically at 1250° F; and this will minimize the side reactions (eg dealkylation, cracking, isomerization, etc.) which might occur with formation of less desirable by-products.

The pressure of reaction may be 0–300 psig, preferably 50–250 psig say 200 psig.

Steam reforming in accordance with this reaction may be carried out by passing the charge hydrocarbon and steam through a reaction zone. Preferably the mole ratio of steam to hydrocarbon entering the reaction zone may be greater than about 15, preferably 15–70, more preferably 20–50, say 30–50, commonly about 35.

As the reaction is carried out at mole ratios above about 50, no substantial increase in the hydrogen yield is normally obtained.

As the mole ratio of steam to hydrocarbon decreases below 30 and especially below 15, the results (as measured e.g. by hydrogen yields) are less satisfactory; and competing reactions may prevail to an undesired degree — especially so when the charge hydrocarbon contains aromatics such as toluene.

Thus in summary, the conditions of temperature T in degrees F, pressure in psig, and mole ratio R of steam to hydrocarbon may be as set forth in the following table:

TABLE

| Condition | Value |
|---|---|
| Temperature ° F | |
| Broad | 1200–1400 |
| Pref. | 1200–1300 |
| Typical | 1250 |
| Mole Ratio | |
| Broad | 15–70 |
| Pref. | 20–50 |
| Typical | 35 |
| Pressure psig | |
| Broad | 0–300 |
| Pref. | 50–250 |
| Typical | 200 |

The steam employed may typically correspond to 150%–500%, say 250% of the stoichiometric amount required for steam reforming.

It is a feature of the novel process of this invention that it be carried out in the presence of a catalyst consisting essentially of a metal screen containing at least about 50% nickel. Although it may be possible to use a screen containing 95%–100% nickel, it is found that such catalysts are undesirably characterized by an activation time which is substantially longer than that of the preferred catalysts containing 50%–95% nickel — by a substantial time factor eg 40 hours for pure nickel versus 16 hours for metal containing 76% nickel such as inconel metal. It is also found that the use of catalyst containing more than 95% nickel yields a system which takes 200%–1800% longer to come on stream (i.e. to reach equilibrium); and the yield of hydrogen may be 10%–40% less than that obtained with the preferred catalyst. The preferred catalyst is also found to be more temperature stable i.e. to maintain its physical integrity and operability for 10%–50%, say 20% longer than the less preferred catalyst. For these reasons, the preferred catalyst may consist essentially of a metal screen containing 50%–95% nickel. Typical of the preferred metals which may be employed may be those having the composition set forth in the following table:

TABLE

| Alloy | Ni | C | Si | S | Mn | Fe | Cu | Cr |
|---|---|---|---|---|---|---|---|---|
| 1 | 80 | | | | | | | 20 |
| 2 | 80 | | | | | | | 20 |
| 3 | 60 | 0.5 | | | 1.75 | 10 | | |
| 4 | 73 | | | | 0.2 | 6.5 | | |
| 5 | 75 | | | | 2 | 12 | | 11 |
| 6 | 61 | | | | | 23 | | 16 |
| 7 | 60 | 0.1 | | | | 24 | 16 | |
| 8 | 76 | 0.04 | 0.20 | 0.0075 | | 7.2 | 0.10 | 15.8 |

The preferred metal may be one containing at least 50% nickel, preferably 50%–95%, more preferably about 60%–90%, more preferably one containing at least about 75% nickel. A more preferred metal may be a nickel-chromium alloy such as one containing at least about 75% nickel, 10%–20%, say about 16% chromium, and about 5%–15%, say about 7% iron and lesser amounts of other components. A preferred metal may be that sold as Inconel 600 containing about 76% nickel, 15.8% chromium, 7.2% iron, 0.20% silicon, 0.10% copper, 0.04% carbon, and 0.007% sulfur.

Although a spool of wound wire or crushed wire may be employed as the massive metal screen catalyst, it is preferred to use a metal screen which is made of a woven wire mesh. Typically the wire mesh may be made of wire having a diameter of 0.003 to 0.182 mm preferably 0.0045–0.018 mm, say 0.05 mm.

The preferred catalyst may be mesh made of Inconel 600 metal; and the woven metal screen or wire mesh may be rolled into a cylindrical roll in manner so that typically 60–90 grams may occupy 100 cc of reaction volume. This may provide a surface area of 2–100 $cm^2/g$, typically 10–40, say 17 $cm^2$ per gram of catalyst.

In practice of the process of this invention, the hydrocarbon charge may be passed into contact with the catalyst at a liquid volume hourly space velocity LHSV of 0.01–1.0, preferably 0.1–0.5, say 0.125.

It is a feature of the process of this invention that the catalyst be activated prior to use; and preferably this is carried out by heating to 700°–1400° F, preferably 700°–800° F say 800° F at 0–400 psig, say 200 psig for at least about 4 hours, preferably 4–30 hours, say about 18 hours in the presence of an oxygen-containing gas, typically air, at a space velocity VHSV of 50–1000, say 300.

When the hydrogen yield drops to an unacceptable level, the catalyst may be reactivated or regenerated by a comparable procedure.

Alternatively if the catalyst does not reach full activity due to presence of trace amounts of poisons, activation may be effected by (a) maintaining the catalyst at 1200°–1400° F for 0.5–6 hours in the presence of charge hydrocarbon without steam (b) introducing steam into the flowing charge hydrocarbon, and (c) adjusting the temperature to desired operating temperature. If the yield is below desired levels, this procedure may be repeated.

During steam reforming in practice of the process of this invention, the charge hydrocarbon gases may be converted to hydrogen in conversion approaching the stoichiometric conversion. Typically conversions as high as 98% may be obtained; and conversions above 90% are common. The product stream may contain hydrogen in amount of 1000–15,000 SCF/BBL of charge, preferably 4000–10,000 SCF/BBL, say 10,000 SCF/BBL.

It is a feature of this invention that use of the novel activated metal screen catalyst, containing about 50%–95% nickel in the preferred embodiment, permits attainment of outstanding results in terms of hydrogen production. It is also an unexpected feature of these catalysts, particularly one containing about 75% nickel, such as inconel wire mesh, that they permit attainment of substantially greater yields of hydrogen than may be obtained by the use of alloys containing lesser quantities of (or no) nickel on the one hand or of metal catalysts containing 95%–100% nickel on the other hand.

The novel catalyst systems of this invention are particularly characterized by their ability to come on stream quickly at their maximum level of activity. For example it may be found that an inconel-containing catalyst may reach its substantial maximum catalytic activity after 1–5 hours, frequently after only about one hour of operation; a pure nickel catalyst may require as long as 12–18 hours to reach maximum level.

DESCRIPTION OF PREFERRED EMBODIMENT

Practice of the process of this invention will be apparent to those skilled in the art from the following illustrative embodiments wherein, as elsewhere in this description, all parts are parts by weight unless otherwise specifically stated.

EXAMPLES I-V

In this series of experimental examples, the catalyst is 160.1g of 11 mil Inconel 600 mesh (possessing a surface area of 17 square meters per gram) rolled into a cylindrical roll and fitted into approximately 200 cc of reactor volume. This catalyst was activated prior to use by heating in air at VHSV of 300° at 800° F and 200 psig for about 18 hours. The catalyst was then used to reform a sulfolane raffinate having the following properties:

| Component | Vol % |
| --- | --- |
| Paraffins | 96 |
| Unsaturates | 2 |
| Naphthenes | — |
| Aromatics | 2 |
| IBP ° F | 95 |
| EP ° F | 320 |

The conditions of operation and the results were as set forth in the following Table:

TABLE

| | I | II | III | IV | V |
| --- | --- | --- | --- | --- | --- |
| Hours on Stream | 1 | 2 | 3 | 4 | 5 |
| Temp. ° F | 1200 | 1205 | 1205 | 1205 | 1210 |
| Press psig | 200 | 200 | 200 | 200 | 200 |
| $H_2O$: Raff. mole ratio | 33 | 32 | 32 | 32 | 33 |
| Raffinate VHSV | 0.125 | 0.125 | 0.125 | 0.125 | 0.125 |
| Raffinate Conversion % Charge | 84 | 93 | 94 | 95 | 94 |
| $H_2$ Yield SCFB | 1309 | 4267 | 6718 | 6583 | 10350 |

From the above Table, it will be apparent that raffinate may be converted in amount up to 95% of the charge; and that hydrogen yields may be obtained in amount of over ten thousand SCFB. Comparable examples carried out using catalyst which has not been activated, yield little or no hydrogen.

EXAMPLES VI-IX

The catalyst of Examples I-V had been subsequently accidentally contaminated by contact with equipment which had previously been used to handle a material containing sulfur; thereafter the catalyst was unsuccessfully used in steam reforming of toluene. This inert catalyst was regenerated by passing air (VHSV of 300) at 800° F and 200 psig over the catalyst for 16 hours. The regenerated catalyst was then employed to reform the same sulfolane raffinate as was charged in Examples I-V, and the results are as follows:

TABLE

| | VI | VII | VIII | IX |
| --- | --- | --- | --- | --- |
| Hours on Stream | 1 | 2 | 3 | 4 |
| Temp. ° F | 1205 | 1205 | 1200 | 1200 |
| Pressure psig | 200 | 200 | 200 | 200 |
| $H_2O$: Raff Mole Ratio | 35 | 35 | 35 | 35 |
| Raffinate VHSV | 0.125 | 0.105 | 0.115 | 0.125 |
| Raff. Conversion Mol % charge | 98 | 93 | 92 | 91 |
| $H_2$ Yield SCFB | 10,435 | 13,199 | 11,373 | 11,034 |

From the above Table it will be apparent that air burning effectively regenerated the catalyst; and in fact it increased the hydrogen generation (over that achieved in eg Examples I-V) to as high as 13,199 SCFB.

EXAMPLES X-XIX

In the following series of examples, various metals were used as catalyst as follows:

Examples X-XI 144g of Inconel 600 screen of 11 mil. wire containing 76% Ni, 15.8% Cr, 7.4% Fe, 0.20% Si, 0.10% Cu, 0.04% C, and 0.007% S;

Example XII and XVII-XIX 160 g of Inconel 600 screen of 11 mil. wire;

Example XIII

No catalyst i.e. empty reactor;

Example XIV 163 g of SS 304 (Stainless Steel) screen of 11 mil wire having specifications: 19% Cr, 9% Ni, 2.00% max Mn, 1.0% Si, 0.08% C, and balance Fe;

Example XV 162 g of SS 430 (Stainless Steel) screen of 11 mil wire having specifications: 16% Cr, 1.00% max Mn, 1.00% Si, 0.12% C, 0.04% P, 0.03% S, and balance Fe; and

Examples XVI 144 g of nickel screen of 11 mil wire containing 99 + % Ni. and trace amounts of C.

In each of Examples X-XIX (except XIII), the catalyst was activated by passing air (at one standard liter per minute) at 800° F and 200 psig through the catalyst bed for 16 hours.

TABLE

| | X | XI | XII | XIII* | XIV* | XV* | XVI | XVII | XVIII* | XIX* |
| --- | --- | --- | --- | --- | --- | --- | --- | --- | --- | --- |
| Hours on Stream | 1 | 5 | 4 | 4 | 4 | 4 | 18 | 24 | 23 | 25 |
| Temp. ° F | 1197 | 1205 | 1200 | 1200 | 1205 | 1200 | 1195 | 1198 | 1202 | 997 |
| Pressure psig | 100 | 200 | 200 | 200 | 200 | 200 | 215 | 200 | 200 | 300 |
| Raffinate VHSV | 0.065 | 0.115 | 0.125 | 0.125 | 0.104 | 0.120 | 0.117 | 0.075 | 0.125 | 0.130 |
| $H_2O$: Raff. Mole Ratio | 62 | 35 | 35 | 32 | 34 | 32 | 40 | 19 | 8 | 9 |
| Raff. Conv. Mol % Charge | 92 | 92 | 91 | 92 | 84 | 88 | 96 | 100 | 100 | 100 |
| $H_2$ Yield SCFB | 14,884 | 13,397 | 11,034 | 259 | 466 | 379 | 7700 | 9967 | 5942 | 1516 |
| % Ni in Cat | 76 | 76 | 76 | — | 9 | 0 | 99+ | 76 | 76 | 76 |

*Control

From the above table, it will be apparent that the metal catalyst of Examples X, XI, and XII, containing about 76% nickel, permitted attainment of outstanding results in terms of hydrogen yield — which in each case was above 11,000 SCFB. In contrast, the hydrogen production in the empty reactor of control Example XIII was 259 SCFB of hydrogen. Use in control Example XIV of a metal containing 9% nickel yielded only 466 SCFB of hydrogen. Use of a catalyst which was substantially entirely nickel (99+% in experimental Example XVI) under comparable conditions yielded 7700 SCFB of hydrogen. The yield may increase after operation for a period of time sufficient to give equilibrium condition (about 40 hours). The yield of hydrogen in non-preferred Example XVI may also be increased by activating this catalyst for a longer period of time (viz 40 hours).

From the above table, it will also be apparent that (Example XVIII) use of a steam to hydrocarbon ratio of 8, which is below the preferred lower limit, is less effective than the use of a ratio of eg 35 as in Examples XI and XII. Similarly in Example XIX, the use of temperature of 997° F, which is below the preferred lower limit of 1200° F, also gives lower yields.

EXAMPLES XX-XXIV

In this series of examples, a wire mesh made of 11 mil Inconel 600 nickel-containing wire was used as catalyst. 200 grams of this mesh, possessing a surface area of 17 square centimeters per gram was rolled into a cylindrical roll and fitted into approximately 600 cc of reactor volume. Hydrocarbon (n-heptane in Examples XX, XXIII, and XXIV and Udex raffinate containing 80.7 vol % paraffins, 7.8 vol % naphthenes, and 11.5 vol % alkylbenzenes in Examples XXI-XXII) vapor was passed through the catalyst bed under the conditions set forth in the Table which follows. In Examples XX, XXI, XXII, and XXIV, the catalyst was activated as in Examples I-V. In Example XXIII, the catalyst was not activated.

TABLE

| Example | XX | XXI | XXII* | XXIII* | XXIV |
|---|---|---|---|---|---|
| Hours on Stream | 56 | 22 | 40 | 20 | 56 |
| Temp. ° F | 1200 | 1200 | 1000 | 1200 | 1300 |
| $H_2O$:hydrocarbon Mole Ratio | 34 | 31 | 31 | 29 | 26 |
| HC LHSV | 0.32 | 0.18 | 0.18 | 0.087 | 0.0462 |
| HC Conversion % Charge | 100 | 100 | 52 | low | 100 |
| $H_2$ Yield SCFB | 9887 | 9841 | 1281 | 1132 | 10,916 |
| % Ni in Cat | 76 | 76 | 76 | 76 | 76 |

*Control

From the above table, it will be apparent that experimental Examples XX, XXI, and XXIV permit attainment of hydrogen yields of about 10,000 SCFB and conversion of hydrocarbon charge of about 100%. Control Example XXII* shows that at 1000° F, which is below the preferred lower limit of 1200° F, the hydrogen yield is only 1281 SCFB after 40 hours of operation. Control Example XXIII*, using catalyst which has not been activated, shows attainment after 20 hours of operation of hydrogen yield of 1132 SCFB. Compare this with say Example XXI wherein the activated catalyst under substantially the same conditions gives hydrogen yield of 9841 SCFB.

Although this invention has been illustrated by reference to specific embodiments, it will be apparent to those skilled in the art that various changes and modifications may be made which clearly fall within the scope of this invention.

We claim:

1. The method of steam reforming a non-aromatic hydrocarbon charge which comprises
    passing a mixture of steam and a non-aromatic hydrocarbon at 1200°-1400° F into contact with an activated catalyst consisting essentially of a massive metal screen containing at least about 50% nickel thereby forming a product gas containing hydrogen and carbon dioxide, said activated catalyst having been activated by heating in the presence of an oxygen-containing gas;
    maintaining the mole ratio of steam to hydrocarbon at 15-70:1; and
    recovering said product gas.

2. The method of steam reforming a non-aromatic hydrocarbon charge as claimed in claim 1 wherein said activation includes heating said massive metal at 700°-1400° F in the presence of an oxygen-containing gas.

3. The method of steam reforming a non-aromatic hydrocarbon charge as claimed in claim 1 wherein said activation includes heating said massive metal at 700°-1400° F in the presence of air.

4. The method of steam reforming a non-aromatic hydrocarbon charge as claimed in claim 1 wherein said catalyst contains about 50%-95% nickel 5. The method of steam reforming a non-aromatic hydrocarbon charge as claimed in claim 1 wherein said catalyst contains about 60%-90% nickel.

6. The method of steam reforming a non-aromatic hydrocarbon charge as claimed in claim 1 wherein said catalyst contains about 75% nickel.

7. The method of steam reforming a non-aromatic hydrocarbon charge as claimed in claim 1 wherein said catalyst contains about 76% nickel and about 15.8% chromium.

8. The method of steam reforming a non-aromatic hydrocarbon charge as claimed in claim 1 wherein said catalyst is inconel metal.

9. The method of steam reforming a non-aromatic hydrocarbon charge as claimed in claim 1 wherein said catalyst is in the form of wire.

10. The method of steam reforming a non-aromatic hydrocarbon charge as claimed in claim 1 wherein said catalyst is in the form of wire mesh.

11. The method of steam reforming a non-aromatic hydrocarbon charge as claimed in claim 1 wherein said charge hydrocarbon is a paraffinic hydrocarbon charge.

12. The method of steam reforming a non-aromatic hydrocarbon charge as claimed in claim 1 wherein said charge hydrocarbon contains less than about 20% of aromatic components.

13. The method of steam reforming a non-aromatic hydrocarbon charge as claimed in claim 1 wherein said steam reforming is carried out at about 1250° F.

14. The method of steam reforming a non-aromatic hydrocarbon charge which comprises
    passing said non-aromatic hydrocarbon charge and steam into contact at 1200°-1400° F and 0-300 psig with, as catalyst, a screen of activated metal containing 50%-95% nickel thereby forming a product gas containing hydrogen and carbon dioxide, said activated catalyst having been activated by heating in the presence of an oxygen-containing gas; and
    recovering said product gas.

15. The method of steam reforming a non-aromatic hydrocarbon charge which comprises passing said non-aromatic hydrocarbon charge and steam into contact at 1200° F–1400° F and 0–300 psig with, as catalyst, a screen of metal containing 50%–95% nickel which has been activated by heating at 700° F–1400° F in the presence of air, thereby forming a product gas containing hydrogen and carbon dioxide; and recovering said product gas.

16. The method of steam reforming a non-aromatic hydrocarbon charge which comprises maintaining a body of catalyst consisting essentially of a massive metal screen containing 50%–95% nickel;

heating said body of catalyst at 700°–1400° F in the presence of an oxygen-containing gas thereby forming an activated catalyst;

thereafter passing a mixture of steam and non-aromatic hydrocarbon charge into contact with said activated catalyst at 1200°–1400° F thereby forming a product gas containing hydrogen and carbon dioxide; and recovering said product gas.

17. The method of activating a steam reforming catalyst consisting essentially of a massive metal screen containing at least about 50% nickel which comprises heating said massive metal screen at 700° F–1400° F in the presence of an oxygen-containing gas thereby forming an activated massive metal screen catalyst; and recovering said activated massive metal screen catalyst.

18. The method of activating a steam reforming catalyst consisting essentially of a massive metal screen containing at least about 50% nickel as claimed in claim 17 wherein said activation is carried out at 0–400 psig and the oxygen-containing gas is passed into contact with the massive metal screen catalyst at a VHSV of 50–1000.

19. The method of activating a steam reforming catalyst consisting essentially of a massive metal screen containing at least about 50% nickel as claimed in claim 17 wherein said oxygen-containing gas is air.

* * * * *